(12) United States Patent
Takeyama et al.

(10) Patent No.: US 7,085,043 B2
(45) Date of Patent: Aug. 1, 2006

(54) OPTICAL AMPLIFIER

(75) Inventors: Tomoaki Takeyama, Kawasaki (JP); Shinya Inagaki, Kawasaki (JP); Keiko Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 19 days.

(21) Appl. No.: 11/045,221

(22) Filed: Jan. 31, 2005

(65) Prior Publication Data

US 2006/0087723 A1 Apr. 27, 2006

(30) Foreign Application Priority Data

Oct. 25, 2004 (JP) ............... 2004-309179

(51) Int. Cl.
*H04B 10/12* (2006.01)
(52) U.S. Cl. ................. 359/337.1; 359/337.4
(58) Field of Classification Search ............ 359/337.1, 359/337.12, 337.13, 337.4, 341.41, 341.42
See application file for complete search history.

(56) References Cited

U.S. PATENT DOCUMENTS 6,359,726 B1 * 3/2002 Onaka et al. ............ 359/337.1
6,671,085 B1 * 12/2003 So et al. ................ 359/341.42

FOREIGN PATENT DOCUMENTS

| JP | 05-003356 | 1/1993 |
|---|---|---|
| JP | 07-202306 | 8/1995 |
| JP | 08-248455 | 9/1996 |

OTHER PUBLICATIONS

Cechan Tian et al., "Analysis and Control of Transient Dynamics of EDFA Pumped by 1480-and 980-nm Lasers," *Journal of Lightwave Technology*, vol. 21, No. 8, Aug. 2003, pp. 1728-1734.
Cechan Tian et al., "Novel Solution for Transient Control of WDM Amplifiers Using the Combination of Electrical Feedforward and Feedback," *CLEO*, 2002, p. 430.

* cited by examiner

*Primary Examiner*—Mark Hellner
(74) *Attorney, Agent, or Firm*—Bingham McCutchen LLP

(57) ABSTRACT

An optical amplifier of the invention comprises first and second optical amplification sections connected in a cascade manner between an input terminal and an output terminal. Optical isolators which block C-band ASE travelling in an opposite direction to L-band signal light, are inserted on the amplification medium of each of the optical amplification sections. A constant gain control section calculates the number of wavelengths based on the input power of signal light, and controls the pumping light power of each optical amplification section at a constant slope with respect to the number of wavelengths, so that the respective gains in the optical amplification sections corresponding to the number of wavelengths each become constant. As a result, it is possible to maintain flat gain wavelength characteristics even when receiving input of WDM light where the number of wavelengths varies rapidly over a wide range.

17 Claims, 12 Drawing Sheets

FIG.9
(A)
WITH OPTICAL ISOLATOR
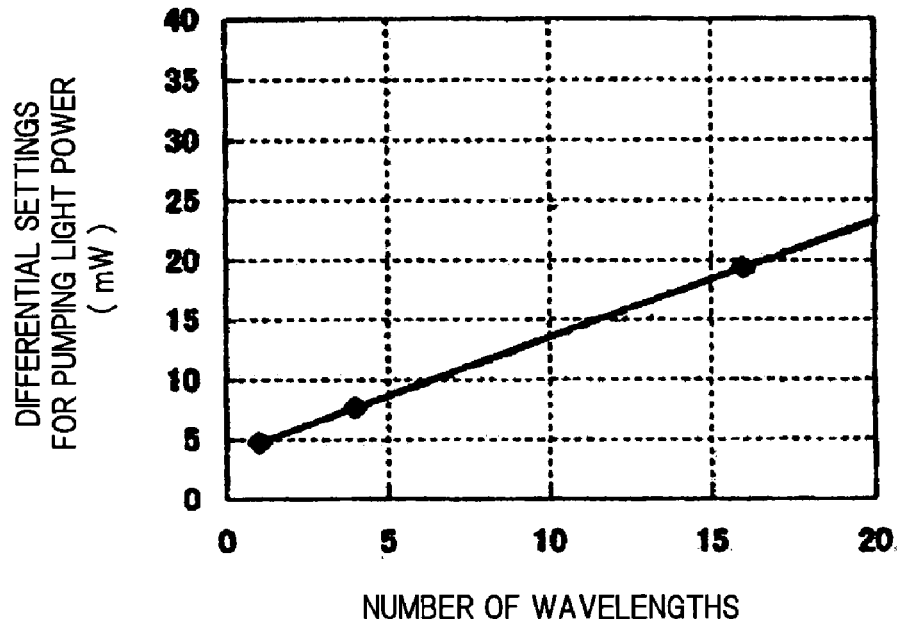
(B)
WITHOUT OPTICAL ISOLATOR
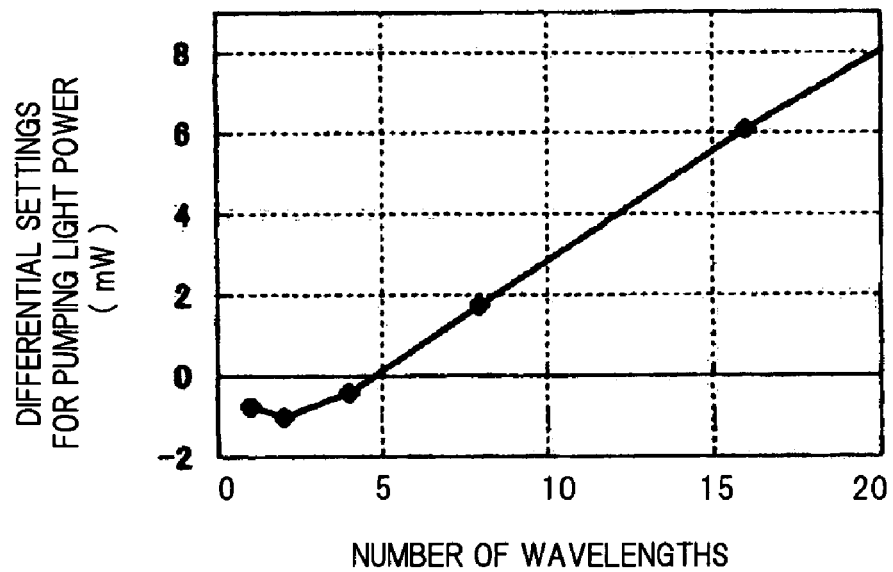

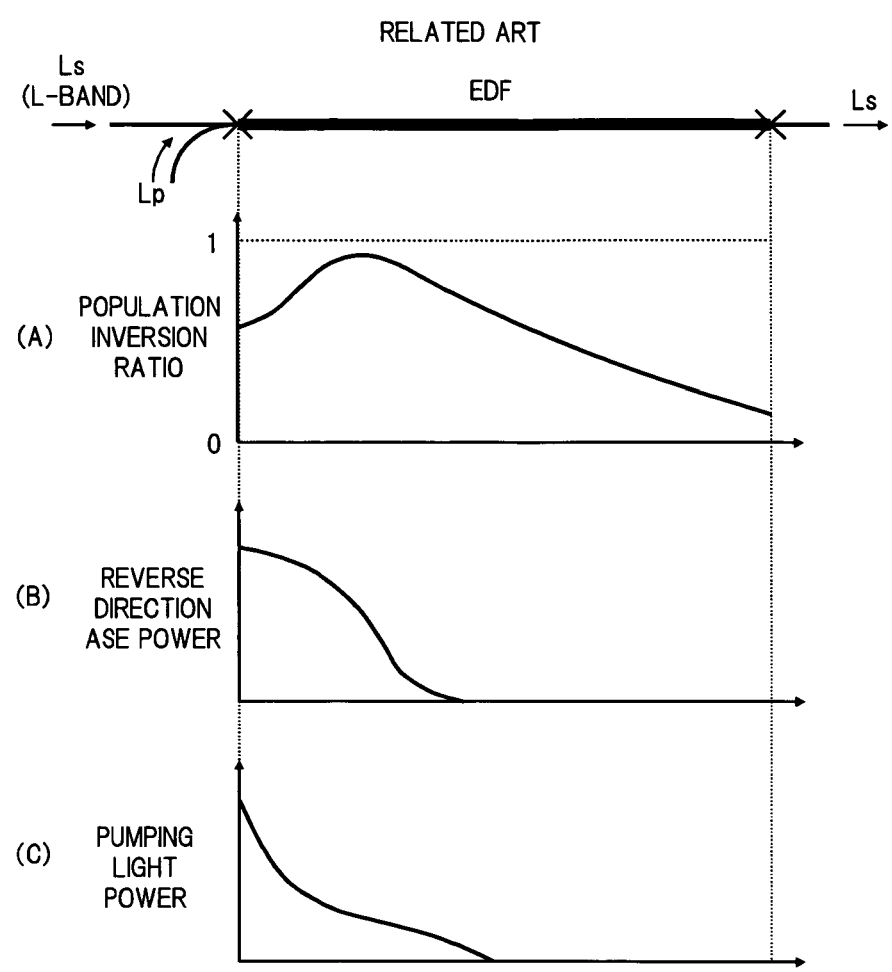

OPTICAL AMPLIFIER

BACKGROUND OF THE INVENTION (1) Field of the Invention

The present invention relates to an optical amplifier used in the field of optical communication, and in particular to an optical amplifier which amplifies wavelength division multiplexed (WDM) light which includes a plurality of optical signals arranged within a predetermined wavelength band.

(2) Description of the Related Art

Recently, progress in Internet technology has led to a rapid increase in the demand for information services, and in trunk optical transmission systems, further increases in capacity are required, and a flexible network structure is desired. The most effective transmission technology for meeting such demands on optical transmission systems is WDM transmission. WDM transmission is a method of transmitting a plurality of optical signals with different wavelengths over a single fiber optic cable by multiplexing the signals. At present, progress is being made in the commercialization of WDM optical transmission systems mainly in North America, for example.

A key component in the realization of a WDM transmission system is the rare earth doped optical fiber amplifier. A typical example of such a rare earth doped optical fiber amplifier is an EDFA (Erbium-Doped Fiber Amplifier) which uses optical fiber doped with erbium ($Er^{3+}$) in the core (Erbium-Doped Fiber: EDF) as the amplification medium. An EDFA is an optical amplifier capable of amplifying WDM light collectively using the wide gain band obtained by the induced emission of erbium pumped by a pumping light supplied to the amplification medium. The first EDFAs to be commercialized were those corresponding to a wavelength band of approximately 1530 to 1560 nm (C-band) where the amplification efficiency is highest, and at present, EDFAs corresponding to the wavelength band of approximately 1570 to 1610 nm (L-band), which has the next highest amplification efficiency after C-band, are also being commercialized.

EDFAs as described above are used in optical repeaters and the like in WDM optical transmission systems. The most widely used optical repeaters and the like are multistage devices where a plurality of EDFs are connected in a cascade manner, which realize relatively flat gain wavelength characteristics (see Japanese Unexamined Patent Publication No. 7-202306, for example).

The power level of the WDM light which enters such an optical repeater varies according to such factors as the degree of loss in the transmission path which precedes the optical repeater. When this variation in the level of optical input to the optical repeater results in the total gain of the multistage EDFs deviating from a constant value, a problem occurs in that the flatness of the gain wavelength characteristics is no longer maintained, which causes tilt, and results in deterioration in the quality of such characteristics as the transmission distance and transmission band of the WDM optical transmission system.

FIG. 10 is a diagram showing the results of measuring the variation in the gain wavelength characteristics according to the optical input level of the optical repeater. Here, WDM light composed of 8 channels of signal light spaced evenly within a signal wavelength band of 1575 nm to 1610 nm, for example, was input into an optical repeater, and the input power of the WDM light was changed within a range from –14 dBm/ch to –6 dBm/ch (dynamic range 8 dB), while measuring the amount of deviation from the gain wavelength characteristics observed at an optical input level of –10 dBm/ch. The vertical axis in FIG. 10 indicates the amount of deviation (dB) of the gain wavelength characteristics, and the horizontal axis indicates the wavelength (nm).

From FIG. 10 it is apparent that when the EDFA is controlled such that substantially flat gain wavelength characteristics are obtained when the input level of the WDM light is –10 dBm/ch, when the input level changes from –14 dBm/ch towards –6 dBm/ch, the tilt of the gain wavelength characteristics changes from negative (an incline down and to the right in the diagram) to positive (an incline up and to the right in the diagram). The occurrence of such gain tilt causes the transmission quality to deteriorate.

In order to prevent this deterioration in transmission quality resulting from gain tilt caused by variation in the input level as described above, conventional technology is known whereby deterioration in the flatness of the gain wavelength characteristics is compensated for by providing a variable optical attenuator (VOA) between stages in a two stage EDF, for example, and keeping the gain of each EDF constant by adjusting the pumping light level while monitoring the input/output levels of the first stage and the second stage EDFs (see Japanese Unexamined Patent Publication No. 8-248455, for example).

FIG. 11 is a diagram showing an example of a construction of a conventional optical amplifier which can maintain flat gain wavelength characteristics over a wide input dynamic range. In this conventional optical amplifier, the power of WDM light Ls input to and output from a first stage EDF 111 is monitored by optical branching couplers 114 and 116 and photodetectors (PD) 115 and 117, and the power of the pumping light Lp1 supplied to the EDF 111 from a pumping light source (LD) 112 via a multiplexer 113 is controlled by an AGC circuit 118 so that the gain calculated based on the results of this monitoring equals a predetermined target gain A. Furthermore, on a second stage EDF 121 side also, in the same manner, the power of pumping light Lp2 is controlled by an AGC circuit 128 so that the gain calculated based on the results of monitoring by photodetectors (PD) 125 and 127 equals a predetermined target gain B. In addition, the power of the WDM light Ls output from the second stage EDF 121 is determined based on the results of monitoring by the photodetector 127, and the amount of optical attenuation of a VOA 131 is controlled by an ALC circuit 132 so that the optical output power equals a predetermined target value. After the amount of optical attenuation of the VOA 131 is determined, the ALC control loop is opened and this amount of optical attenuation is maintained. Because when this controlled state is entered, the gain in the EDFs 111 and 121 is controlled by the AGC circuits 118 and 128 so as to remain constant even when there is a change in the number of wavelengths of the optical signals within the WDM light Ls, an optical amplifier with flat gain wavelength characteristics can be realized.

FIG. 12 shows an example of an energy level diagram according to input level, for such a conventional optical amplifier. It is apparent from FIG. 12 that the EDF gain A and B for each stage is controlled so as to remain constant regardless of variation in the input level, and that the amount of optical attenuation of the VOA 131 increases or decreases according to the input level.

However, in metro network systems and the like, demand for which has continued to build in recent years, because the number of wavelengths in the WDM light varies freely over a wide range during transmission, it is desirable that the pumping light of the optical amplifier be controlled at a high speed to continually maintain constant gain even when faced with dynamic and high speed variation in the number of wavelengths.

However, with this example of a conventional construction shown in FIG. 11, when the number of wavelengths in the WDM light is increased or decreased, the gain is kept constant by repeating a control loop wherein the pumping light power is adjusted according to the amount of gain deviation relative to the target gain A or B in each EDF stage at the current point in time. But with such a control system, a problem occurs in that limitations imposed by the speed limit of the control circuit cause large fluctuations in gain whenever the number of wavelengths in the WDM light is increased or decreased.

A construction has been proposed for a conventional optical amplifier where high speed control is performed as a means to cope with this problem. For example, as shown in FIG. 13, a wavelength number calculation circuit 243 which recognizes changes in the number of wavelengths in the WDM light based on input monitoring results obtained by an optical branching coupler 241 and a photodetector (PD) 242 provided upstream from a first stage EDF 211 is provided, power settings are obtained in advance for pumping lights Lp1 and Lp2 at which settings the overall gain of the optical amplifier relative to the number of wavelengths remains constant (A+B=constant) and are stored in a memory circuit 244, and the power of the pumping lights Lp1 and Lp2 supplied to the EDFs 211 and 221 is controlled by a pumping light power control circuit 245 according to the number of wavelengths as recognized by the wavelength number calculation circuit 243 and the corresponding information in the memory circuit 244 (see for example Reference Document 1: Cechan Tian et al., J. Lightwave Tech., vol.21, no.8, pp1728–1734, 2003. and Reference Document 2: Cechan Tian and Susumu Kinoshita, "Novel solution for transient control of WDM amplifiers using the combination of electrical feedforward and feedback," CLEO2002, CW02, Long Beach, 2002). With such a conventional optical amplifier, because any change in the number of wavelengths is recognized quickly by the input monitor, and the number of AGC loops reduces from two to one, the gain of the optical amplifier can be controlled at high speed so as to remain constant even when increasing or decreasing the number of wavelengths.

However, with the conventional optical amplifier as shown in FIG. 13, if the number of wavelengths in the WDM light changes, even if the overall gain of the optical amplifiers can be kept constant, the gain distribution (energy level diagram) for each stage changes freely depending on the settings used for the power of the first stage pumping light Lp1 and the power of the second state pumping light Lp2. Therefore the following problems occur.

For example, as shown in FIG. 14, when the number of wavelengths is a low number (for example 1 channel) as opposed to when the number of wavelengths is a maximum (for example 88 channels), in the case where the gain A of the first stage EDF 211 is large and the gain B of the second stage EDF 221 is small, the input level of the second state EDF 221 is higher when the number of wavelengths is low. Therefore the total ASE optical power generated in the optical amplifier will be smaller. Regarding the fluctuations which occur in the ASE optical power when the number of wavelengths changes, these remains unstable momentarily due to the response speed of the EDF. Therefore, as shown in FIG. 15 for example, even assuming an ideal situation where the speed of the control circuit is sufficiently fast, and where immediately after reducing the number of wavelengths there is no fluctuation in the total optical power, that is the sum of the residual channel power and the ASE power, a phenomenon occurs whereby the ASE optical power fluctuates slowly in a delayed manner before reaching a stable state. As a result, as shown in FIG. 15, there occurs a phenomenon whereby the residual channel power fluctuates towards the minus side when the number of wavelengths is reduced. This fluctuation of the residual channel power also occurs to an equivalent degree in repeaters positioned on the downstream side. Therefore, the fluctuation accumulates for each relay amplifier present, and exceeds the tolerance for fluctuation able to be received by the receiver. FIG. 16 shows the data from experiments relating to the transitional fluctuation of the residual channel power mentioned above. After a reduction in the number of wavelengths in the input light is completed (corresponding to the dashed line in the diagram), 3 to 4 ms is required before the residual channel power stabilizes to the desired constant level, and this delay is related to the response speed of the ASE light.

In order to avoid such gain fluctuation phenomena, it is necessary to ensure that the ASE optical power does not change regardless of the number of wavelengths, that is ensure that the gain in the EDFs 211 and 221 does not change regardless of the number of wavelengths. A way of realizing this is to obtain in advance power distribution settings for each pumping light Lp1 and Lp2 at which the gain for both EDF 211 and 221 stages remains constant (A=constant, B=constant) with respect to changes in the number of wavelengths, as shown in the energy level diagram in FIG. 17, for example, and store this information in the storage circuit 244.

However, in an EDFA corresponding to the L band, for example, it is known that in order to ensure that the gain of the EDF 211 and 221 stages is constant with respect to changes in the number of wavelengths, the power of each pumping light Lp1 and Lp2 must be controlled in a complicated manner following a nonlinear relationship as shown in FIG. 18, for example, in accordance with the number of wavelengths. Specifically, from the characteristics example in FIG. 18 it is apparent that in a range where the number of wavelengths is less than a given constant, that is, the input power is less than a given constant, the required pumping light power tends towards the increase. This indicates a phenomenon where in the L band EDFA, the amplification efficiency deteriorates when used in a region where the input power is less than a given constant.

The following is a description of the theory of this deterioration in amplification efficiency, with reference to FIG. 19.

In a forward pumping type L-band EDFA as shown in the upper part of FIG. 19, if the input power becomes low, the population inversion at the part near the signal entry end of the EDF becomes very high, as shown in FIG. 19 (A). As a result, there is a large amount of C-band ASE light generated in this part, as shown in FIG. 19 (B). In addition, while the ASE light of the ASE light within this C-band, which is traveling in the opposite direction to the signal light propagates towards the signal entry end, then as shown in FIG. 19 (C) the pumping light is wasted in amplification of this ASE light traveling in the opposite direction, which results in deterioration of the amplification efficiency.

Accordingly, there is a problem in that the complicated control of the pumping light power in an L band EDFA as shown in FIG. 18 leads to a reduction in the control speed of the electric circuit and an increase in the cost of the electric circuit.

SUMMARY OF THE INVENTION

The present invention addresses the above points, with an object of providing an optical amplifier which amplifies WDM light having a predetermined wavelength band, wherein the optical amplifier is capable of maintaining flat gain wavelength characteristics even when receiving input of WDM light where the number of wavelengths varies rapidly over a wide range.

In order to achieve the above object, an optical amplifier of the present invention comprises: a plurality of optical amplification sections connected in a cascade manner between an input terminal and an output terminal, which amplify wavelength multiplexed light which includes a plurality of signal lights arranged within a predetermined wavelength band; a constant output control section which has a variable optical attenuator arranged on at least one optical path which connects between said plurality of optical amplifiers, and controls said variable optical attenuator so that the power of wavelength multiplexed light output to said output terminal remains constant at a preset target level; and a constant gain control section which calculates the number of wavelengths in said wavelength multiplexed light based on the power of wavelength multiplexed light input to said input terminal, and according to the calculation result, controls each optical amplification section so that the overall gain of said plurality of optical amplification sections is constant. The plurality of optical amplification sections applied to this optical amplifier each have: an amplification medium wherein the core is doped with a rare earth; a pumping light source which generates pumping light; a multiplexer which applies the pumping light emitted by said pumping light source to said amplification medium from a signal entry end; and a light blocking device inserted at a predetermined position on said optical amplification medium, which is capable of blocking amplified spontaneous emission light (ASE light) generated within said amplification medium which has a different wavelength band from the wavelength multiplexed light and which travels in the opposite direction to the wavelength multiplexed light. Furthermore, they are constructed so that a part of the amplification medium which is on the signal exit end side of the insertion position of said light blocking device is pumped by pumping light applied from the signal entry end side from said pumping light source via said multiplexer. Moreover, said constant gain control section controls the pumping light power of each optical amplification section at a constant slope with respect to the number of wavelengths in the wavelength multiplexed light, so that the respective gains in said plurality of optical amplification sections is constant.

In an optical amplifier having the construction described above, by inserting the light blocking device at a predetermined position on the amplification medium in each of the plurality of amplification sections, the amount of pumping light which is wasted in amplification of the ASE light generated within the amplification medium and traveling in the opposite direction is reduced, and amplification efficiency is improved. As a result, the need to control the pumping light power of each optical amplification section in a complicated manner following a non-linear relationship, in order to ensure that the gain in each of the plurality of optical amplifications sections is constant can be eliminated. Therefore, the gain in each of the optical amplifications sections can be made constant using a simple method of controlling the pumping light power of each optical amplification section at a constant slope with respect to the number of wavelengths, that is, following a linear relationship. By realizing such constant gain control, the aforementioned transitional fluctuations in the residual channel power which occurred during changes in the number of wavelengths in the WDM light no longer occur, and it becomes possible to perform constant gain control of the optical amplification sections in a reliable manner.

According to the optical amplifier of the present invention as described above, even if the number of wavelengths in the input WDM light varies rapidly over a wide range, it is possible to realize flat gain wavelength characteristics regardless of the number of wavelengths, and a WDM light where the output power of the signal light of each wavelength is made at a constant level can be easily obtained.

Other objects, features and advantages of the present invention will become apparent from the following description of embodiments, in conjunction with the appended drawings.

BRIEF DESCRIPTION OF THE DRAWINGS

FIG. 9 is a diagram showing an example of differential settings for the pumping light power in this other embodiment.

FIG. 19 is a diagram for explaining the theory of deterioration in amplification efficiency in an L-band EDFA.

DETAILED DESCRIPTION OF THE INVENTION

Figure 1:
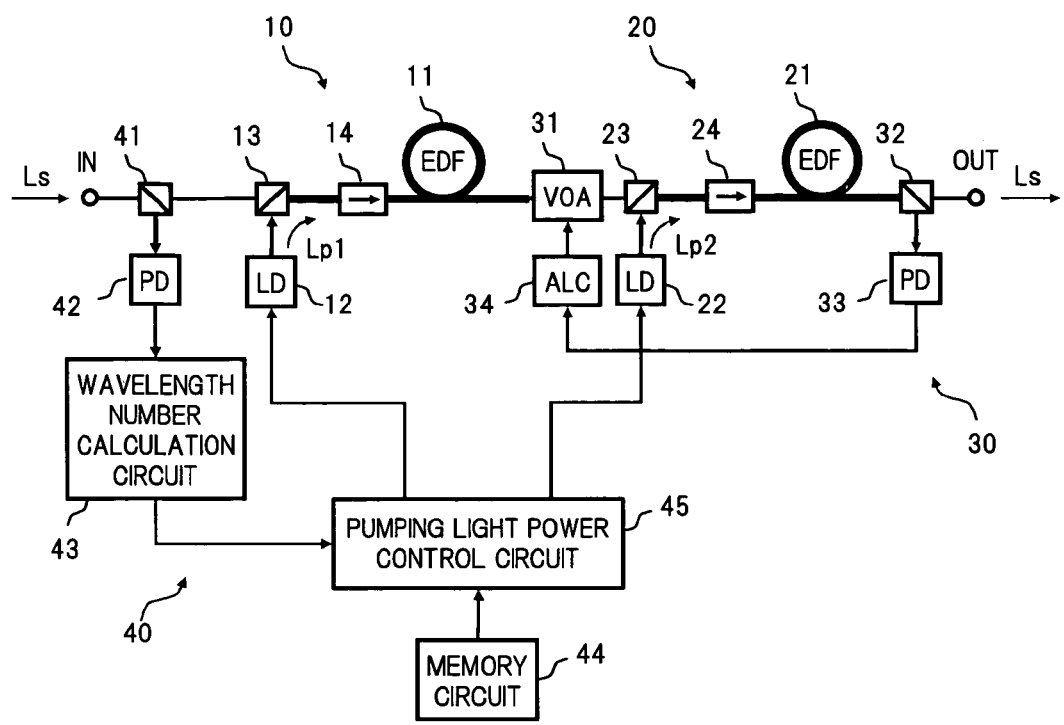
FIG. 1 is a block diagram showing an embodiment of the present invention.

A best mode for carrying out the invention is described below with reference to the appended drawings. Throughout all of the diagrams, the same reference numerals refer to the same or corresponding parts.

FIG. 1 is a block diagram showing the construction of a first embodiment of an optical amplifier according to the present invention.

In FIG. 1, the optical amplifier of the present embodiment comprises, for example, a first optical amplification section 10 and a second optical amplification section 20 connected in a cascade manner between an input terminal IN and an output terminal OUT, a constant output control section 30 which controls the power of WDM light Ls output to the output terminal OUT so as to keep the power constant, and a constant gain control section 40 which calculates the number of wavelengths based on the power of the WDM light Ls input to the input terminal IN, and in accordance with the number of wavelengths controls the power of each pumping light so that the gain of the optical amplification sections 10 and 20 is constant.

The first optical amplification section 10 comprises, for example; an erbium doped fiber (EDF) 11 as the amplification medium, a pumping light source (LD) 12 which generates a pumping light Lp1, a multiplexer 13 which multiplexes the pumping light Lp1 from the pumping light source 12 together with the signal light Ls and applies them to the EDF 11, and an optical isolator 14 which acts as a light blocking device at a predetermined position on the EDF 11, which prevents the propagation of ASE light traveling in the reverse direction. It is assumed that the signal light Ls input from the input terminal IN to the first optical amplification section 10 is WDM light which includes a plurality of optical signals located in the L-band (1570 to 1610 nm), and the number of wavelengths varies rapidly over a wide range. The pumping light Lp1 is supplied to the EDF 11 in the same direction as the signal light Ls via the multiplexer 13 arranged at the signal entry end of the EDF 11, and pumps the erbium within the EDF 11 according to a later described longitudinal population inversion ratio (forward pumping). The optical isolator 14 is inserted at a predetermined position on the EDF 11 on the signal entry end side thereof, and passes light traveling in the same direction as the signal light Ls, and blocks light traveling in the opposite direction to the signal light Ls. The specific insertion position of this optical isolator 14 is described below.

In the same manner as the first optical amplification section 10, the second optical amplification section 20 comprises; an EDF 21, a pumping light source 22, a multiplexer 23 and an optical isolator 24. The signal light Ls amplified in the first optical amplification section 10 is input to this second optical amplification section 20 via a variable optical attenuator (VOA) 31, described below, of the constant output section 30. The signal light Ls is amplified in the EDF 21 which has undergone forward pumping by means of pumping light Lp2 from the pumping light source 22, and is output to the output terminal OUT.

Here a construction is used in which the first and second optical amplification sections 10 and 20 are forward pumping type devices. However the present invention is not limited to this, and a bidirectional pumping type construction is also possible in which means for also supplying pumping light from the signal exit end side of the EDFs 11 and 21 are separately provided.

The constant output control section 30 comprises, for example; the variable optical attenuator (VOA) 31, an optical branching coupler 32, a photodetector (PD) 33, and an ALC circuit 34. The variable optical attenuator 31 is connected between the first and second optical amplification sections 10 and 20, and the variable optical attenuation amount is controlled by output signals from the ALC circuit 34. The optical branching coupler 32 branches part of the signal light Ls output from the second optical amplification section 20 to the output terminal OUT and outputs this part to the photodetector 33. The photodetector 33 receives the branched light from the optical branching coupler 32 and detects the power of the light, and then outputs a signal indicating the results to the ALC circuit 34. The ALC circuit 34 then controls the amount of optical attenuation of the variable optical attenuator 31 based on the output signal of the photodetector 33 so that the output level of the signal light Ls remains constant at a preset target level.

The constant gain control section 40 comprises, for example; an optical branching coupler 41, a photodetector (PD) 42, a wavelength number calculation circuit 43, a memory circuit 44, and a pumping light power control circuit 45. The optical branching coupler 41 branches part of the signal light Ls sent from the input terminal IN to the first optical amplification section 10 and outputs this part to the photodetector 42. The photodetector 42 receives the branched light from the optical branching coupler 41 and detects the power of the light, and then outputs a signal indicating the results to the wavelength number calculation circuit 43. Here the optical branching coupler 41 and the photodetector 42 function as an input monitor. The wavelength number calculation circuit 43 then calculates the number of wavelengths in the signal light Ls based on the output signal of the photodetector 42, and outputs a signal indicating the results to the pumping light power control circuit 45. Power settings for the pumping lights Lp1 and Lp2 at which constant gain is achieved in each of the first and second optical amplification sections 10 and 20 are stored in advance in the memory circuit 44, corresponding to the number of wavelengths of the signal light Ls. The pumping light power control circuit 45 retrieves the power settings for the pumping lights Lp1 and Lp2 stored in the memory circuit 44, corresponding to the number of wavelengths indicated by the output signal of the wavelength number calculation circuit 43, and controls both of the pumping light sources 12 and 22 of the first and second optical amplification sections 10 and 20 according to the retrieved data.

As follows is a detailed description of the insertion positions of the optical isolators 14 and 24 on the EDFs 11 and 12 of the first and second optical amplification sections 10 and 20.

Figure 2:
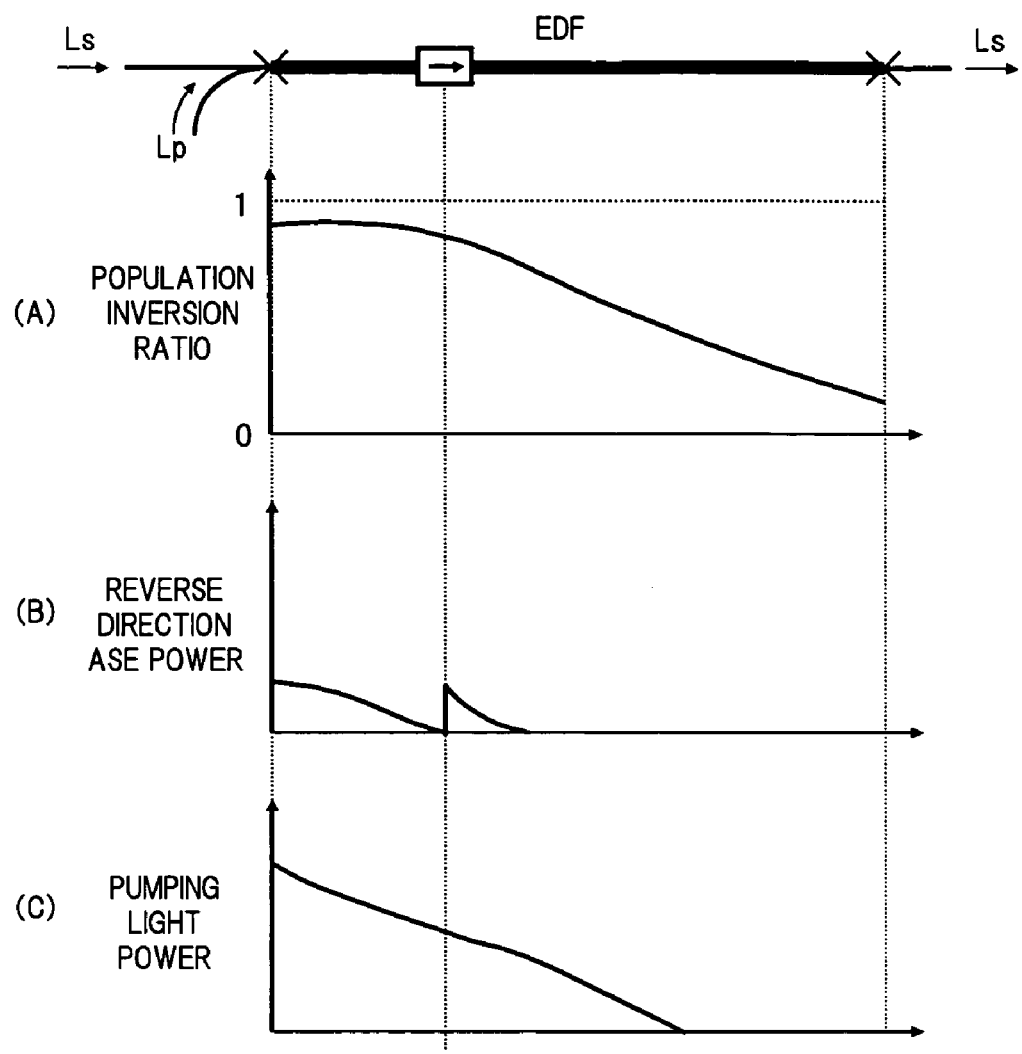
FIG. 2 is a diagram for explaining the theory of improvement in amplification efficiency in this embodiment.

In the present invention, in order to eliminate the above-mentioned phenomenon which occurs when the present invention is used in the region where the input power of the L-band signal light Ls is at or below a constant, whereby the amplification efficiency deteriorates because the pumping light Lp1 and Lp2 is wasted in the optical amplification of the component of the C-band ASE light generated within the EDF 11 and the EDF 21, which travels in the opposite direction to the signal light Ls, the optical isolators 14 and 24 are inserted at predetermined positions in the longitudinal direction on the EDFs 11 and 21. The following is a brief description of the theory of improvement in the amplification efficiency obtained by the insertion of the optical isolators 14 and 24, with reference to FIG. 2. By inserting an optical isolator at a position on the EDF on the signal entry end side as shown in the upper part of FIG. 2, C-band ASE light generated at parts in the EDF near the signal entry end which travels in the opposite direction to the signal light Ls are blocked by the optical isolator. Therefore, the power of the ASE light which travels in the opposite direction as shown in FIG. 2 (B), becomes zero at the insertion position of the optical isolator. As a result, as is apparent from the changes in pumping light power shown in FIG. 2 (C), the proportion of the pumping light Lp wasted in the amplification of the ASE light which travels in the opposite direction is lower than when an optical isolator is not inserted on the EDF (see FIG. 19 (C)). Therefore it is possible to obtain an improvement in amplification efficiency.

Figure 3:
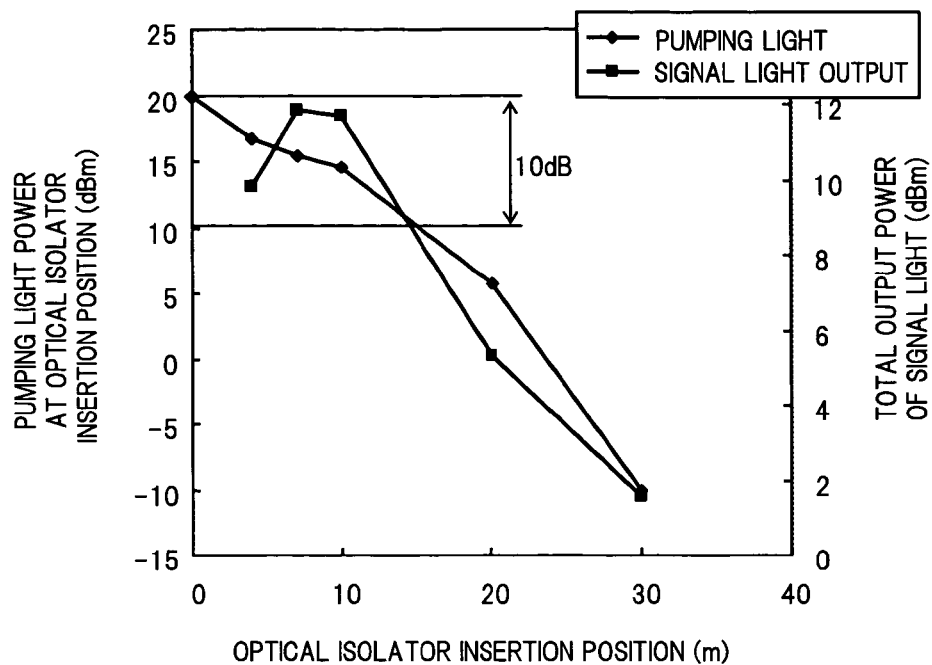
FIG. 3 is a diagram showing the results of a simulation relating to the insertion position of an optical isolator in this embodiment.

Regarding the insertion position of the optical isolator in the longitudinal direction on the EDF, it is possible to set in advance a range within which improvement is obtained in the amplification efficiency, by for example calculating the power of the pumping light Lp at the insertion position as well as the total output power of the signal light Ls for that time, for when optical isolator insertion positions are changed, using a simulation or the like. FIG. 3 shows an example of the results of such a simulation. From these it is apparent that by defining a range for the insertion position of the optical isolator as from the vicinity of the signal entry end of the EDF to the position where the power of the pumping light Lp attenuates by 10 dB within the EDF, an improvement effect in the amplification efficiency can be obtained.

Specifically, imagine a case where in the construction shown in FIG. 1, the number of wavelengths in the signal light Ls varies within a range from 1 to 88, the lower limit of the input power per channel is −35 dBm/ch, the upper limit is −20 dBm/ch (an input dynamic range of 15 dB), and the target value for constant output control is −1 dBm/ch. In such a case, assuming that the length of the EDFs 11 and 21 of the first and second optical amplification sections 10 and 20 is 52.2 m, for example, the amplification efficiency can be effectively improved by inserting the optical isolators 14 and 24 at positions 7 m from the signal entry end of the EDFs 11 and 21, respectively. However, this does not mean that the insertion position of the optical isolators on the EDF in the present invention is limited to this specific example.

Figure 4:
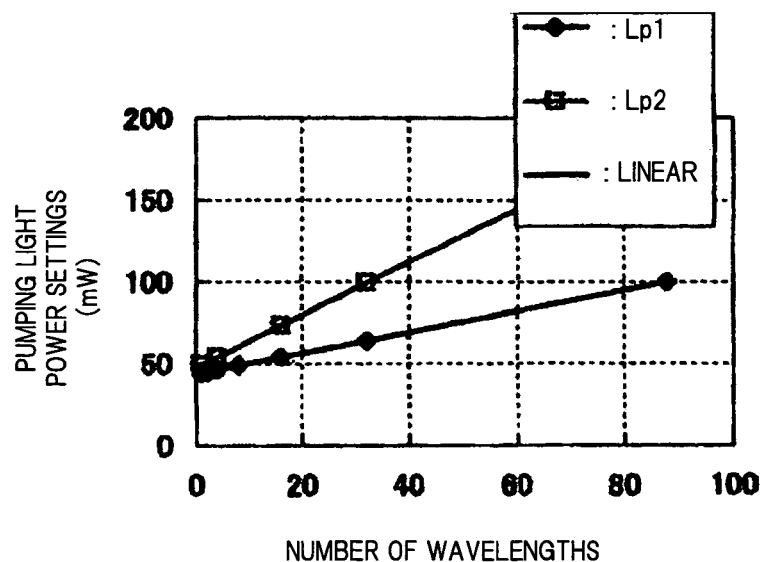
FIG. 4 is a diagram showing an example of power settings for each pumping light in this embodiment.
Figure 5:
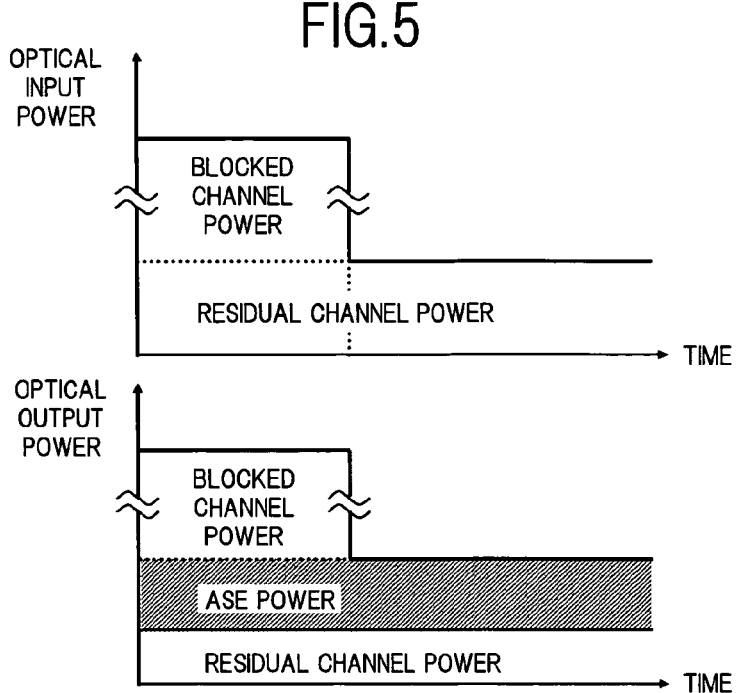
FIG. 5 is a diagram showing residual channel power during wavelength subtraction in this embodiment.
Figure 18:
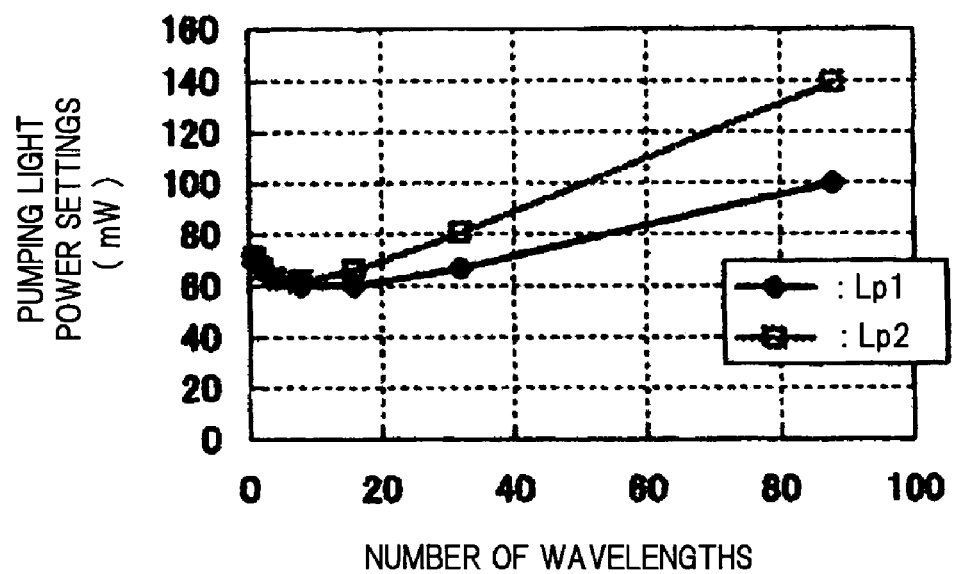
FIG. 18 is a diagram showing pumping light power settings for realizing the control shown in FIG. 17 in a typical L-band EDFA.

By inserting the optical isolators 14 and 24 in suitable positions on the EDFs 11 and 21 on the signal entry end side thereof in the manner described above, and thereby avoiding deterioration in the amplification efficiency caused by C-band ASE light traveling in the opposite direction, complex control of the power of the pumping lights Lp1 and Lp2 as shown in FIG. 18 becomes unnecessary, and it becomes possible to control the amount of power to add to each pumping light Lp1 and Lp2 with respect to the number of wavelengths according to a predetermined slope, as shown in FIG. 4, for example. Because the gains A and B in the first and second optical amplification sections 10 and 20 can each be kept constant by simple control following a linear relationship in this manner, it becomes possible to avoid such problems as a reduction in the control speed of the electric circuit or an increase in the cost of the circuit, which were a problem with conventional L-band optical amplifiers. Furthermore, by keeping the gain A and B in the first and second optical amplification sections 10 and 20 both constant, the transitory fluctuation which occurs in the ASE optical power when reducing the number of wavelengths of the optical signal Ls as shown in FIG. 5, does not appear, and the power remains constant. Therefore, fluctuations in the residual channel power can also be suppressed.

In the above manner, according to the L-band optical amplifier of the present embodiment as described above, even when the number of wavelengths in the signal light Ls varies rapidly over a wide range, flat gain wavelength characteristics can be realized regardless of the number of wavelengths, and it is possible to obtain a signal light Ls controlled to the desired output level by the constant output control section 30.

Figure 6:
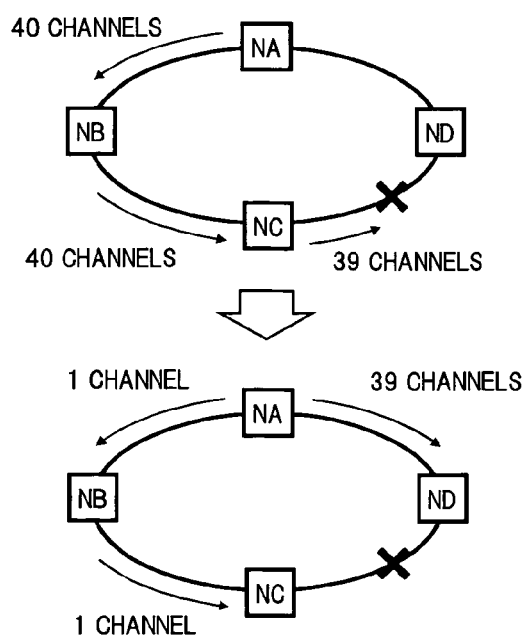
FIG. 6 is a diagram showing one example of an optical transmission system suited for use with the optical amplifier of this embodiment.

Such an L-band optical amplifier is suited to use as an optical amplifier provided within an optical repeater in an optical transmission system configured in a ring shape as shown in FIG. 6, for example. This example of an optical transmission system supposes a situation where one channel of signal light is transmitted from station NA via station NB to station NC, and 39 channels of signal light are transmitted to station ND. Here, if for example a line fault occurs in the optical fiber between station NC and station ND (upper part of FIG. 6), the anomaly is detected immediately by station NB, and measures are taken to switch the 39 channels of signal light which were being transmitted from station NA towards station NB to reverse transmission (anticlockwise in the diagram), thereby ensuring that communication from station NA to station ND is uninterrupted (lower part of FIG. 6). In this case, because the number of wavelengths in the input signal light changes from 40 to 1, the optical amplifiers provided in station NB must be able to reliably control the pumping light power and the like even when faced with such dynamic and rapid changes in the number of wavelengths. Therefore the optical amplifier of the present embodiment can be applied effectively to this situation.

Next, a modified example of the optical amplifier shown in FIG. 1 is described.

Figure 7:
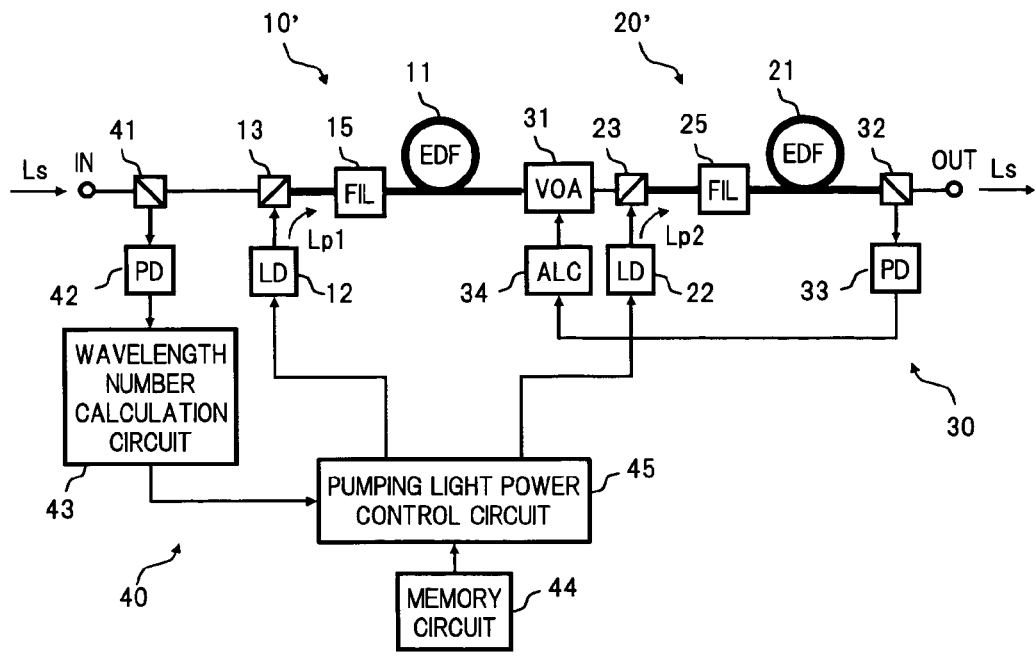
FIG. 7 is a block diagram showing the configuration of a modified example of the embodiment.

FIG. 7 is a block diagram showing the configuration of the modified example of the optical amplifier.

The part where the construction of the optical amplifier shown in FIG. 7 differs from that shown in FIG. 1, is that instead of the optical isolators 14 and 24 of the first and second optical amplification sections 10 and 20, there is provided first and second optical amplification sections 10' and 20' which have optical filters (FIL) 15 and 25 inserted at predetermined positions on the EDF 11 and EDF 21. The optical filters 15 and 25 are a known type of optical filter having characteristics which enable C-band light to be blocked while allowing light in the L-band and the wavelength band of the pumping light (for example the 1480 nm band) to pass. The construction of parts other than the above is the same as in FIG. 1, and hence description thereof is omitted.

In an optical amplifier which uses optical filters 15 and 25 in this manner, the C-band ASE light which is generated in the EDFs 11 and 21 and travels in the opposite direction towards the signal entry end is blocked by the optical filters 15 and 25 in the same manner as if the optical isolators 14 and 24 described above were used. Therefore an improvement is obtained in the amplification efficiency. However, when using the optical filters 15 and 25, the C-band ASE light generated upstream from the insertion positions of the optical filters 15 and 25, which travels in the same direction as the signal light is blocked by the optical filters 15 and 25, and no longer acts as pumping light beyond the insertion positions of the optical filters 15 and 25. Consequently, the overall amplification efficiency of the optical amplifier decreases slightly when compared to a case where the optical isolators 14 and 24 are used. However because it is possible to control the pumping light power according to a linear relationship as shown in FIG. 4 due to the improvement effect in amplification efficiency resulting from the blocking of reverse direction ASE light, a low cost electric circuit capable of fast control can be realized, and the problems of conventional devices can be solved.

In the construction described above based on FIG. 1 and FIG. 7, either optical isolators or optical filters were provided in both of the first and second optical amplification sections. However an optical isolator may be provided in one of either the first or second optical amplification sections, and an optical filter provided in the other.

Next, another embodiment of an optical amplifier according to the present invention is described.

In the aforementioned pumping light power control method in the optical amplifier shown in FIG. 1, if there is a change in the environmental temperature, a temperature dependency occurs in the overall gain of the optical amplifier according to the temperature dependency of the loss of the various optical components constituting the optical amplifier. In an other embodiment described below, an application example is described which applies a control method which enables the temperature dependency of the gain to be suppressed.

Figure 8:
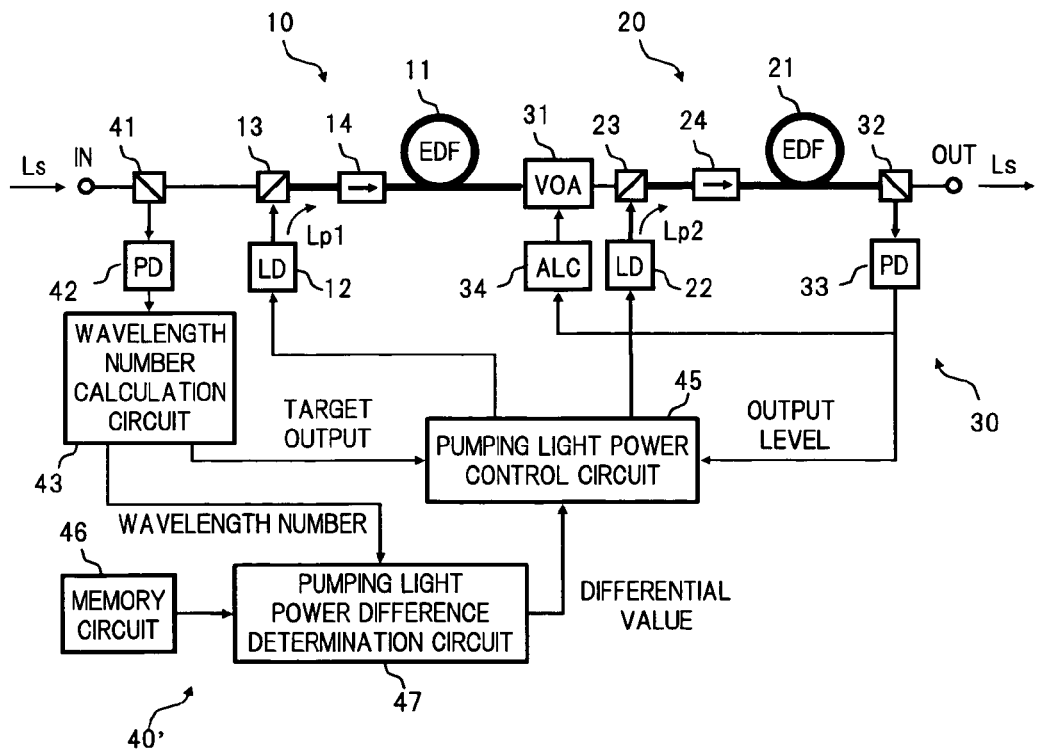
FIG. 8 is a block diagram showing the construction of another embodiment of the present invention.
Figure 10:
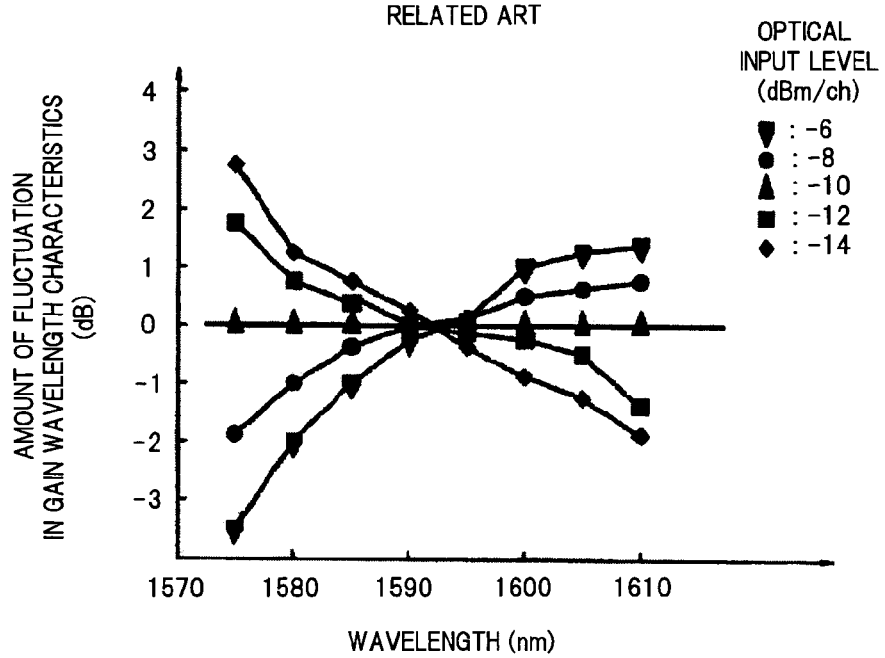
FIG. 10 is a diagram showing the results of measuring the fluctuation in gain wavelength characteristics according to the optical input level in a typical optical repeater.
Figure 11:
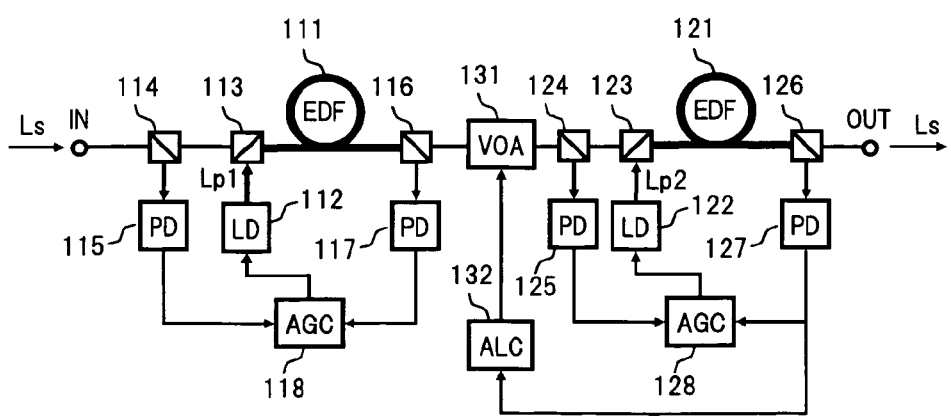
FIG. 11 is a block diagram showing an example of the configuration of a conventional optical amplifier.
Figure 12:
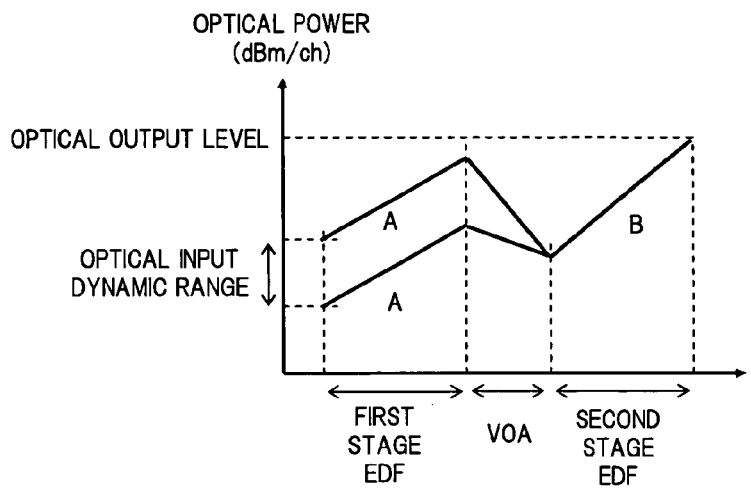
FIG. 12 is a diagram showing an example of an energy level diagram according to optical input level, for the optical amplifier in FIG. 11.
Figure 13:
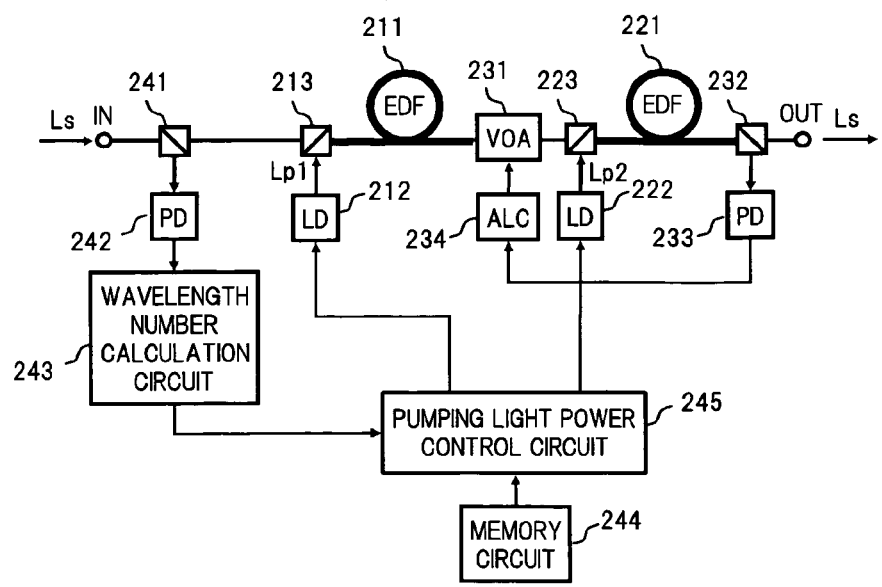
FIG. 13 is a block diagram showing a configuration example of a conventional optical amplifier with high speed pumping light control.
Figure 14:
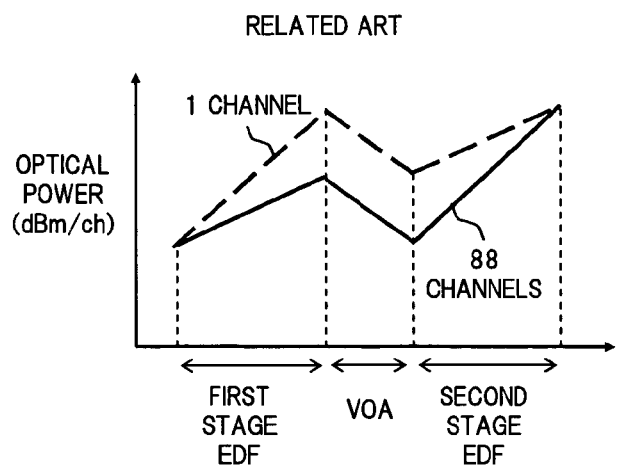
FIG. 14 is a diagram showing an example of an energy level diagram according to the number of wavelengths, for the optical amplifier in FIG. 13.
Figure 15:
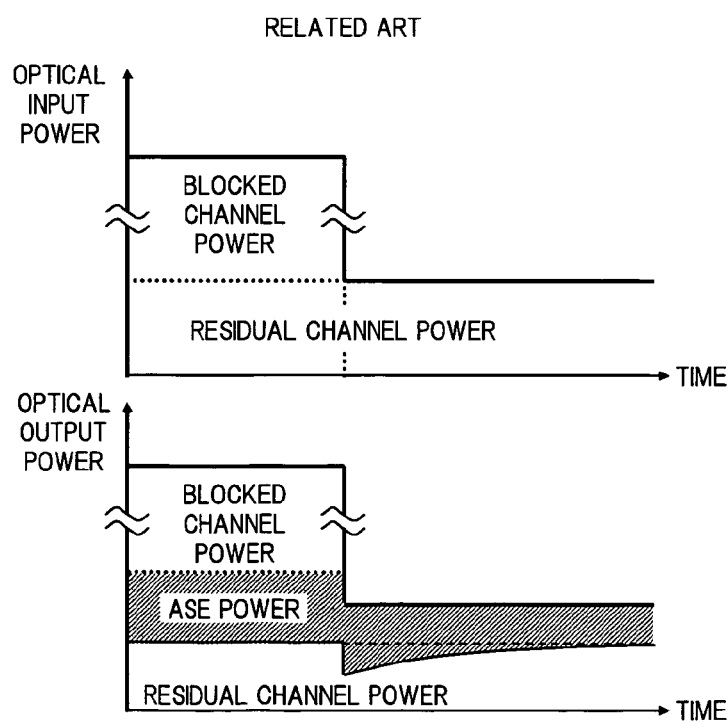
FIG. 15 is a diagram showing the changes in residual channel power during wavelength subtraction, in the optical amplifier in FIG. 13.
Figure 16:
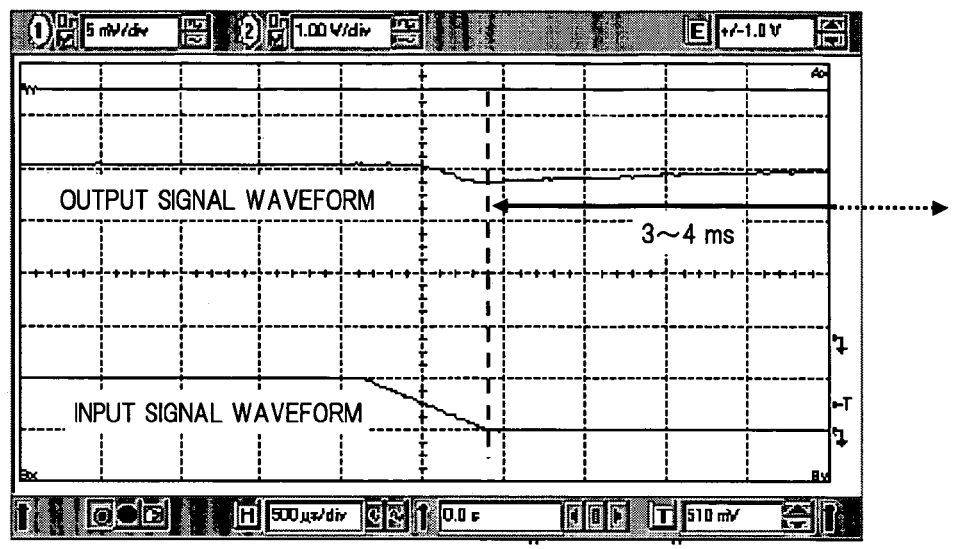
FIG. 16 is a diagram showing experimental data relating to transitional fluctuations in the ASE optical power.
Figure 17:
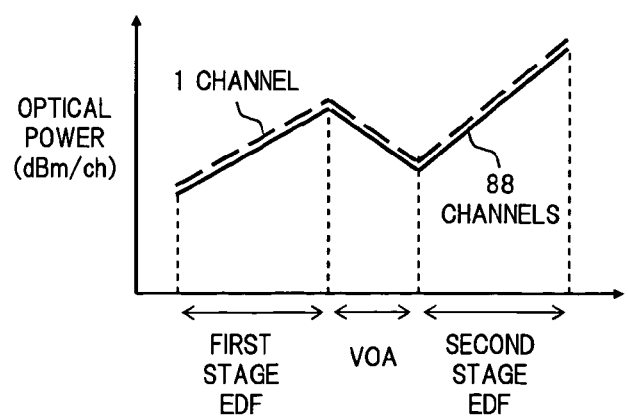
FIG. 17 is a diagram for explaining a control method for pumping light power for avoiding gain fluctuation phenomena.

FIG. 8 is a block diagram showing the construction of an optical amplifier according to this other embodiment.

In order to compensate for such a temperature dependency in the gain, the control of pumping light power in the optical amplifier shown in FIG. 8 is characterized in realizing constant gain control by repeating a loop involving performing feedback control of the pumping light sources 12 and 22 by monitoring the input/output power of the optical amplifier and obtaining the difference between the current output power and a target value for the signal light output power, and determining the next power setting for the pumping lights Lp1 and Lp2 according to this difference. Furthermore, here, regarding the power distribution of the pumping lights Lp1 and Lp2, the power differential of the pumping light Lp1 and the pumping light Lp2 is determined corresponding to the number of wavelengths in the signal light Ls, and the pumping light sources 12 and 22 are controlled based on the results.

Specifically, in the configuration example of FIG. 8, the input power of the signal light Ls detected by the optical branching coupler 41 and the photodetector 42 is sent to the wavelength number calculation circuit 43, in the same manner as in the case of FIG. 1. The wavelength number calculation circuit 43 then calculates the number of wavelengths based on the input power of the signal light Ls, and outputs a signal indicating the results to a pumping light power difference determination circuit 47, and outputs the target value for the signal light output power which corresponds with the relevant number of wavelengths, to the pumping light power control circuit 45. The pumping light power difference determination circuit 47 then retrieves data from a memory circuit 46 according to the output signal from the wavelength number calculation circuit 43, and determines the power differential of the pumping lights Lp1 and Lp2 corresponding to the number of wavelengths in the signal light Ls, and then outputs a signal indicating the results to the pumping light power control circuit 45. Power differential settings for the pumping lights Lp1 and Lp2 at which the gain in each of the first and second optical amplification sections 10 and 20 becomes constant, are stored in advance in the memory circuit 46, corresponding to the number of wavelengths in the signal light Ls. The pumping light power control circuit 45 performs feedback control of the pumping light sources 12 and 22 by first comparing the target output power value of the signal light Ls as indicated by the output signal from the wavelength number calculation circuit 43 with the current signal light output power as detected by the optical branching coupler 32 and the photodetector 33, then obtaining the degree of discrepancy in the signal light output power (gain) caused by variation in the environmental temperature, and then determining the power settings for each of the pumping lights Lp1 and Lp2 in the next control cycle according to the degree of discrepancy in the signal light output power and the differential settings of the pumping light power as indicated by the output signal from the pumping light power difference determination circuit 47. Here the optical branching coupler 32 and the photodetector 33 of the constant output control section 30 are used as an output monitor in the constant gain control process. However, it is also possible to provide a separate output monitor for this control process.

According to the optical amplifier having the above construction, in the same manner as for the case of the optical amplifier described above with reference to FIG. 1, by inserting the optical isolators 14 and 24 at predetermined positions on the EDFs 11 and 21, it becomes possible to control the differential settings of the power of the pumping lights Lp1 and Lp2 with respect to the number of wavelengths at a predetermined slope as shown in FIG. 9 (A). FIG. 9 (B) shows settings examples for the differential of the pumping light power in a case where optical isolators 14 and 24 are not arranged on the EDFs 11 and 21 (corresponding to a conventional construction). In this manner, the optical amplifier of the present invention can keep the respective gains A and B in the first and second optical amplification sections 10 and 20 constant by a simple control process following a linear relationship as shown in FIG. 9 (A). Furthermore, even if there are changes in the environmental temperature, the discrepancy of the signal light output power from the target value is compensated for by feedback control of the pumping light power. Therefore the overall gain of the optical amplifier can be controlled so as to stay constant without any dependence on environmental temperature.

In the optical amplifier described above with reference to FIG. 8, a configuration example of where the optical isolators 14 and 24 are inserted at predetermined positions on the respective EDFs 11 and 21 is shown. However as with the aforementioned configuration example shown in FIG. 7, optical filters which block C-band light and pass L-band light and light in the pumping light wavelength band, may be provided instead of the optical isolators.

Moreover, in each of the embodiments described above a configuration example was described in which an erbium doped fiber was used as the amplification medium of the first and second optical amplification sections 10 and 20. However the present invention is not limited to this material, and it is possible to use as the amplification medium, an optical fiber wherein the core is doped with a rare earth other than erbium. Furthermore, an optical waveguide may be used as the form for amplification medium instead of optical fiber. In addition, a construction was described in which two optical amplification sections were connected in a cascade manner between the input terminal IN and the output terminal OUT. However even in a case where three or more optical amplification sections are connected in a cascade manner, it is possible to obtain the same operational effects as in the embodiments described above by, respectively inserting light blocking devices such as optical isolators or optical filters at predetermined positions on the amplification media of each optical amplification section, and controlling each pumping light source in accordance with pumping light power settings for which the gain in each optical amplification section remains constant.

What is claimed is:

1. An optical amplifier comprising:
   a plurality of optical amplification sections connected in a cascade manner between an input terminal and an output terminal, which amplify wavelength multiplexed light which includes a plurality of signal lights arranged within a predetermined wavelength band;
   a constant output control section which has a variable optical attenuator arranged on at least one optical path which connects between said plurality of optical optical amplification sections, and controls said variable optical attenuator so that the power of wavelength multiplexed light output to said output terminal remains constant at a preset target level; and
   a constant gain control section which calculates the number of wavelengths in said wavelength multiplexed light based on the power of wavelength multiplexed light input to said input terminal, and according to the calculation result, controls each optical amplification section so that the overall gain of said plurality of optical amplification sections is constant, wherein
   said plurality of optical amplification sections each have:
   an amplification medium wherein the core is doped with a rare earth; a pumping light source which generates pumping light; a multiplexer which applies the pumping light emitted by said pumping light source to said amplification medium from a signal entry end; and a light blocking device inserted at a predetermined position on said optical amplification medium, which is capable of blocking amplified spontaneous emission light generated within said amplification medium which has a different wavelength band from the wavelength multiplexed light and which travels in the opposite direction to the wavelength multiplexed light, and said optical amplification sections are respectively constructed so that a part of the amplification medium which is on the signal exit end side of the insertion position of said light blocking device is pumped by pumping light applied from the signal entry end side from said pumping light source via said multiplexer, and
   said constant gain control section controls the pumping light power of each optical amplification section at a constant slope with respect to the number of wavelengths in the wavelength multiplexed light, so that the respective gains in said plurality of optical amplification sections is constant.

2. An optical amplifier according to claim 1, wherein said wavelength multiplexed light has a wavelength band from 1570 nm to 1610 nm, and
   said plurality of optical amplification sections use a medium wherein the core is doped with erbium as said amplification medium.

3. An optical amplifier according to claim 2, wherein for said plurality of optical amplification sections, the insertion position of each of said light blocking devices on said optical amplification medium is set within a range on a signal entry end side of said amplification medium from a position in the longitudinal direction where the power of the pumping light in the signal entry end attenuates by 10 dB within said amplification medium.

4. An optical amplifier according to claim 2, wherein at least one of said plurality of optical amplification sections uses an optical isolator as said light blocking device, which passes light travelling in the same direction as wavelength multiplexed light inside said amplification medium, and blocks light traveling in the opposite direction.

5. An optical amplifier according to claim 2, wherein at least one of said plurality of optical amplification sections uses an optical filter as said light blocking device, which can block light of a wavelength band from 1530 nm to 1560 nm, and which can pass light of a wavelength band from 1570 nm to 1610 nm and of a wavelength band the same as that of pumping light output from said pumping light source.

6. An optical amplifier according to claim 1, wherein said constant gain control section comprises:
   an input monitor which detects the power of wavelength multiplexed light input to said input terminal;
   a wavelength number calculation circuit which calculates the number of wavelengths of said wavelength multiplexed light based on a detection result of said input monitor;
   a memory circuit which stores in advance corresponding to wavelength number, pumping light power settings for each of the optical amplification sections for making the gains in each of said plurality of optical amplification sections constant; and
   a pumping light power control circuit which determines the pumping light power settings of each of the optical amplification sections according to the number of wavelengths calculated by said wavelength number calculation section and memory information of said memory circuit, and controls each of the pumping light sources of the optical amplification sections in accordance with said settings.

7. An optical amplifier according to claim 1, wherein said constant gain control section comprises:
   an input monitor which detects the power of wavelength multiplexed light input to said input terminal;
   an output monitor which detects the power of wavelength multiplexed light output to said output terminal;
   a wavelength number calculation circuit which calculates the number of wavelengths of said wavelength multiplexed light based on a detection result of said input monitor, and obtains a target value of output power of wavelength multiplexed light corresponding to the calculated number of wavelengths;
   a memory circuit which stores in advance corresponding to wavelength number, pumping light power differential settings for each of the optical amplification sections for making the gains in each of said plurality of optical amplification sections constant;
   a pumping light power difference determination circuit which determines the pumping light power differential setting of each of the optical amplification sections according to the number of wavelengths calculated by said wavelength number calculation section and memory information of said memory circuit; and
   a pumping light power control circuit which obtains the degree of discrepancy in the detection result of said output monitor with respect to the target value of output power obtained by said wavelength number calculating circuit, determines the pumping light power settings of each of the optical amplification sections based on said degree of discrepancy and the determined results of said pumping light power difference determination circuit, and controls each of the pumping light sources of the optical amplification sections in accordance with said settings.

8. An optical amplifier according to claim 1, wherein at least one of said plurality of optical amplification sections is of a bidirectional pumping type construction in which pumping light is also applied to said amplification medium from a signal exit end side.

9. An optical transmission system which repeater transmits wavelength multiplexed light while amplifying in an optical repeater, wherein said optical repeater comprises an optical amplifier according to claim 1.

10. An optical apparatus comprising:
   an input monitor monitoring a power of an input light to the optical apparatus;
   a plurality of optical amplification sections connected in a cascade manner;
   at least one variable optical attenuator positioned between said optical amplification sections;
   an output monitor monitoring a power of an output light from the optical apparatus; an output control section controlling said variable optical attenuator based on the power of output light monitored by said output monitor; and
   a gain control section calculating the number multiplexed lights from the power of input light monitored by said input monitor, wherein
   said plurality of optical amplification section each have:
   a rare-earth doped fiber;
   a pumping light source;
   an optical coupler providing the rare-earth doped fiber the input light and the pumping light; and
   an optical isolator inserted at a predetermined position on said rare-earth doped fiber; and,
   said gain control section controls the pumping light power of each optical amplification section based on the number calculated by the input light.

11. An optical apparatus according to claim 10, wherein
   said wavelength multiplexed light has a wavelength band from 1570 nm to 1610 rim, and
   said optical amplification sections use a medium wherein the core is doped with erbium as said rare-earth doped fiber.

12. An optical apparatus according to claim 11, wherein
   for said optical amplification sections, the insertion position of said optical isolators on said rare-earth doped fiber is set within a range on a signal entry end side of said amplification medium from a position in the longitudinal direction where the power of the pumping light in the signal entry end attenuates by 10 dB within said rare-earth doped fiber.

13. An optical apparatus according to claim 11, wherein
   said optical isolator passes light traveling in the same direction as wavelength multiplexed light inside said rare-earth doped fiber, and blocks light traveling in the opposite direction.

14. An optical apparatus according to claim 10, wherein said gain control section comprises:

a wavelength number calculation circuit which calculates the number of multiplexed lights from the power of input light monitored by said input monitor,
   a memory circuit which stores in advance corresponding to wavelength number, pumping light power settings for each of the optical amplification sections for making the gains in each of said optical amplification sections constant; and
   a pumping light power control circuit which determines the pumping light power settings of each of the optical amplification sections according to the number of wavelengths calculated by said wavelength number calculation section and memory information of said memory circuit, and controls each of the pumping light power of the optical amplification sections in accordance with said settings.

15. An optical apparatus according to claim 10, wherein said gain control section comprises:
   a wavelength number calculation circuit which calculates the number of multiplexed light from the power of input light monitored by said input monitor, and obtains a target value of output power of multiplexed lights corresponding to the calculated number;
   a memory circuit which stores in advance corresponding to wavelength number, pumping light power di8crcrtial settings for each of the optical amplification sections for making the gains in each of optical amplification sections constant;
   a pumping light power difference determination circuit which determines the pumping light power differential setting of each of the optical amplification sections according to the number of wavelengths calculated by said wavelength number calculation section and memory information of said memory circuit; and
   a pumping light power control circuit which obtains the degree of discrepancy in the detection result of said output monitor with respect to the target value of output power obtained by said wavelength number calculating circuit, determines the pumping light power settings of each of the optical amplification sections based on said degree of discrepancy and the determined results of said pumping light power difference determination circuit, and controls each of the pumping light power of the optical amplification sections in accordance with said settings.

16. An optical apparatus according to claim 10, wherein at least one of said plurality of optical amplification sections is of a bidirectional pumping type construction.

17. An optical transmission system which repeater transmits wavelength multiplexed light while amplifying in an optical repeater, wherein said optical repeater comprises an optical apparatus according to claim 10.

* * * * *